Patented Jan. 21, 1930

1,744,295

UNITED STATES PATENT OFFICE

HARRY W. AHLBECK, OF RIVERSIDE, ILLINOIS, ASSIGNOR TO BAKELITE CORPORATION, OF NEW YORK, N. Y., A CORPORATION OF DELAWARE

PROCESS OF MAKING FORMALDEHYDE

No Drawing.   Application filed July 1, 1927.   Serial No. 202,974.

This invention relates to the manufacture of formaldehyde by a catalytic oxidation of methanol.

In this operation it is customary to lead the highly heated reaction mixture from the catalyzers to a condensing system consisting of tubular condensers, or of a scrubber provided with cooling coils. In this operation considerable losses and difficulties are encountered. For example methylal, paraformaldehyde and other products are formed in considerable amount by the reaction of the formaldehyde either within itself or upon the unconverted methanol. Also there is a tendency to corrosion of the equipment by formic acid, which is a by-product of the process.

According to the present invention these difficulties are avoided, and certain advantages are secured, by a novel procedure which in its preferred embodiment is carried out as follows:

A portion of condensate from a previous operation (this condensate consisting essentially of an aqueous solution of formaldehyde, together with some methanol and incidental impurities) is suitably cooled, say to 20–30° C., and brought into direct countercurrent contact with the exit gases from the catalyzer. This operation may be carried out in any type of apparatus affording the necessary intimacy of contact between the liquid and the gas, such for example as a scrubber of the packed type, a jet condenser or series of such condensers or the like.

An important feature of the invention lies in the proper proportioning of the volumes of liquid and gas, to insure that the temperature of the gases (which usually leave the catalyzer at about 340–370° C.) shall be quickly reduced to a point at which no substantial formation of by-products need be feared, without raising the temperature of the liquor to a point favorable to such by-product formation. As a rule I prefer so to proportion the liquid and gas volumes that the temperature of the effluent from the scrubber or other countercurrent device shall not exceed 40–50° C. My invention is not however limited to the choice of these specific temperatures in the liquor entering and leaving the counter-current device, since considerable latitude is permissible in respect to these. Any considerable formation of by-products is indicative of insufficient, or insufficiently rapid, cooling at this point. Naturally the cooling may be supplemented by cooling means within the counter-current device itself.

The gases leaving the counter-current device are contacted with water in a suitable scrubber to complete the recovery of the soluble components. The liquor thus produced, when sufficiently concentrated, may be cooled and supplied to the counter-current device as described above.

Prolonged operation of the recovery system as described above has demonstrated, among its advantages, a greatly reduced production of formic acid, methylal and other objectionable by-products; substantial freedom from corrosion; and avoidance of the danger often encountered in previous systems of stoppage through accumulation of paraformaldehyde or other solid reaction products.

While I prefer to use a cooled liquor derived from a previous recovery operation for effecting the sudden cooling of the highly heated gas-mixture from the catalyzers, it is within the scope of my invention to employ cold water or other appropriate aqueous liquid or solution to accomplish this result.

I claim:

1. Process of making formaldehyde comprising contacting a mixture of methanol and gaseous oxidizing agent with a heated catalyst; and rapidly cooling the resulting highly heated reaction mixture by bringing the same directly into contact with a cool aqueous liquid whereby to prevent the formation of undesired by-products.

2. Process of making formaldehyde comprising contacting a mixture of methanol and gaseous oxidizing agent with a heated catalyst; and rapidly cooling the resulting highly heated reaction mixture by bringing the same directly into contact with a cool liquor derived from a previous recovery operation whereby to prevent the formation of undesired by-products.

In testimony whereof, I affix my signature.

HARRY W. AHLBECK.